United States Patent
Suciu et al.

(10) Patent No.: US 10,352,274 B2
(45) Date of Patent: Jul. 16, 2019

(54) DIRECT DRIVE AFT FAN ENGINE

(71) Applicant: United Technologies Corporation, Farmington, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 217 days.

(21) Appl. No.: 15/240,104

(22) Filed: Aug. 18, 2016

(65) Prior Publication Data

US 2018/0051654 A1   Feb. 22, 2018

(51) Int. Cl.
| | |
|---|---|
| *F02K 3/062* | (2006.01) |
| *B64D 27/14* | (2006.01) |
| *B64C 11/46* | (2006.01) |
| *F02C 7/36* | (2006.01) |
| *F02C 3/10* | (2006.01) |

(52) U.S. Cl.
CPC .............. *F02K 3/062* (2013.01); *B64C 11/46* (2013.01); *B64D 27/14* (2013.01); *F02C 3/10* (2013.01); *F02C 7/36* (2013.01); *F05D 2220/323* (2013.01); *F05D 2260/4031* (2013.01)

(58) Field of Classification Search
CPC ............ B64C 27/14; B64D 2033/0226; B64D 2033/0293
See application file for complete search history.

(56) References Cited

U.S. PATENT DOCUMENTS

| | | | | |
|---|---|---|---|---|
| 3,054,577 | A  * | 9/1962 | Wolf | B64D 27/12 |
| | | | | 244/110 B |
| 3,332,242 | A | 7/1967 | Johnson | |
| 3,366,350 | A  * | 1/1968 | Hoffert | B64D 27/20 |
| | | | | 244/55 |
| 4,474,345 | A | 10/1984 | Musgrove | |
| 5,161,369 | A | 11/1992 | Williams | |
| 6,837,038 | B2 * | 1/2005 | Eiler | B64D 27/02 |
| | | | | 239/265.17 |
| 7,631,484 | B2 | 12/2009 | Giffin et al. | |
| 7,726,113 | B2 | 6/2010 | Orlando et al. | |
| 8,516,789 | B2 | 8/2013 | Kupratis | |
| 8,701,385 | B2 | 4/2014 | Clemen | |
| 9,133,729 | B1 | 9/2015 | McCune et al. | |
| 9,239,012 | B2 | 1/2016 | McCune et al. | |
| 9,297,270 | B2 | 3/2016 | Suciu et al. | |

(Continued)

FOREIGN PATENT DOCUMENTS

| | | |
|---|---|---|
| DE | 102008024463 | 12/2009 |
| EP | 2902608 | 8/2015 |

(Continued)

OTHER PUBLICATIONS

European Search Report for Application No. 17186228.7 dated Jan. 3, 2018.

*Primary Examiner* — Philip J Bonzell
*Assistant Examiner* — Tye William Abell
(74) *Attorney, Agent, or Firm* — Carlson, Gaskey & Olds, P.C.

(57) ABSTRACT

An aircraft engine includes a gas powered turbine core. A first fan is connected to the turbine core via a shaft. The fan is positioned aft of the turbine. A second fan is connected to the first fan via a geared connection.

19 Claims, 6 Drawing Sheets

(56) References Cited

U.S. PATENT DOCUMENTS

| | | | | |
|---|---|---|---|---|
| 2004/0025493 | A1* | 2/2004 | Wojciechowski | F02K 3/06 |
| | | | | 60/224 |
| 2005/0109012 | A1 | 5/2005 | Johnson | |
| 2007/0209368 | A1 | 9/2007 | Giffin et al. | |
| 2009/0145998 | A1* | 6/2009 | Salyer | B64C 27/04 |
| | | | | 244/17.23 |
| 2009/0159740 | A1* | 6/2009 | Brody | B64C 27/10 |
| | | | | 244/17.21 |
| 2012/0128487 | A1* | 5/2012 | Eames | B64C 11/346 |
| | | | | 416/1 |
| 2015/0315965 | A1* | 11/2015 | Moine | F02C 3/305 |
| | | | | 60/775 |
| 2016/0076444 | A1* | 3/2016 | Bailey Noval | F02C 3/107 |
| | | | | 415/68 |
| 2017/0101191 | A1* | 4/2017 | Becker | B64D 27/18 |
| 2017/0121031 | A1* | 5/2017 | Stieger | B64C 21/06 |
| 2017/0361939 | A1* | 12/2017 | Negulescu | B64C 1/16 |

FOREIGN PATENT DOCUMENTS

| | | |
|---|---|---|
| EP | 2998558 | 3/2016 |
| WO | 2016114851 | 7/2016 |

* cited by examiner

DIRECT DRIVE AFT FAN ENGINE

STATEMENT REGARDING FEDERALLY SPONSORED RESEARCH OR DEVELOPMENT

This subject of this disclosure was made with government support under Contract No.: NND15AC56C awarded by NASA. The government therefore may have certain rights in the disclosed subject matter.

TECHNICAL FIELD

The present disclosure relates generally to aft fan aircraft, and specifically to a direct drive engine configuration for an aft fan aircraft.

BACKGROUND

Existing aircraft engines typically include a fan, positioned forward of a turbine core, with the turbine core driving the fan rotation by expanding gasses compressed within a compressor section across a turbine section. Rotation of the fan drives air along a bypass flowpath around the turbine core and generates thrust, allowing the aircraft to operate.

In a typical example, gas turbine engines of this type are mounted to, or in, a wing of the aircraft, with each wing having complimentary engines. In alternative examples, the engines can be mounted to a tail, or a tail region, of the aircraft.

SUMMARY OF THE INVENTION

In one exemplary embodiment an aircraft engine includes a gas powered turbine core, a first fan connected to the turbine core via a shaft, the fan being positioned aft of the turbine, and a second fan connected to the first fan via a geared connection.

Another example of the above described aircraft engine further includes a turbine exhaust flowpath adjacent to at least one of a first fan inlet flowpath and a second fan inlet flowpath.

In another example of any of the above described aircraft engines the shaft is disposed in a fan inlet flowpath of at least one of the first fan and the second fan.

In another example of any of the above described aircraft engines the shaft is disposed in the fan inlet flowpath of the first fan.

Another example of any of the above described aircraft engines further includes a sleeve at least partially surrounding the shaft.

In another example of any of the above described aircraft engines the sleeve is at least partially disposed in the fan inlet flowpath.

In another example of any of the above described aircraft engines the sleeve includes an aerodynamic profile relative to an expected direction of fluid flow through the fan inlet flowpath.

In another example of any of the above described aircraft engines the geared connection is a bevel gear.

In another example of any of the above described aircraft engines the geared connection is connected to a downstream hub of the first fan.

In another example of any of the above described aircraft engines the geared connection is connected to a downstream hub of the second fan.

In another example of any of the above described aircraft engines at least one of the first fan and the second fan is pitched downward.

Another example of any of the above described aircraft engines further includes a third fan connected to the first fan via a geared connection, wherein the first fan is positioned between the second fan and the third fan.

In one exemplary embodiment an aircraft includes a fuselage, and an aircraft engine configuration including a first thrust producing fan and a second thrust producing fan mounted to a tail section of the fuselage, a turbine engine core, a shaft mechanically connecting the turbine engine core to the first thrust producing fan, such that rotation of the turbine engine core is translated to the first thrust producing fan, and a gearing system connecting the first thrust producing fan to the second thrust producing fan such that rotation of the first thrust producing fan drives rotation of the second thrust producing fan.

Another example of the above described aircraft further includes a first fan inlet flowpath at least partially defined by the fuselage.

Another example of any of the above described aircraft further includes a sleeve disposed at least partially about the shaft.

In another example of any of the above described aircraft the sleeve comprises an aerodynamic profile, relative to an expected direction of fluid flow through a first fan inlet flowpath.

Another example of any of the above described aircraft further includes an exhaust manifold connecting an output of the turbine engine core to an aft exhaust port, wherein the aft exhaust port is adjacent the first thrust producing fan.

In another example of any of the above described aircraft the first thrust producing fan is a direct drive fan.

In another example of any of the above described aircraft the gearing system is a beveled gear connection.

In another example of any of the above described aircraft at least one of the first fan and the second fan is pitched downward.

These and other features of the present invention can be best understood from the following specification and drawings, the following of which is a brief description.

DETAILED DESCRIPTION OF AN EMBODIMENT

For certain aircraft applications, providing thrust producing fans on top of, or partially within, the fuselage in a tail region of the aircraft can provide more desirable properties than traditional forward fan gas turbine engines. By way of example, mounting thrust producing fans in this manner can allow the fans to pull in air from a boundary layer surrounding the aircraft fuselage, thereby reducing drag on the aircraft and reducing the engine/fan power required to fly the aircraft at a given air speed.

Figure 1:
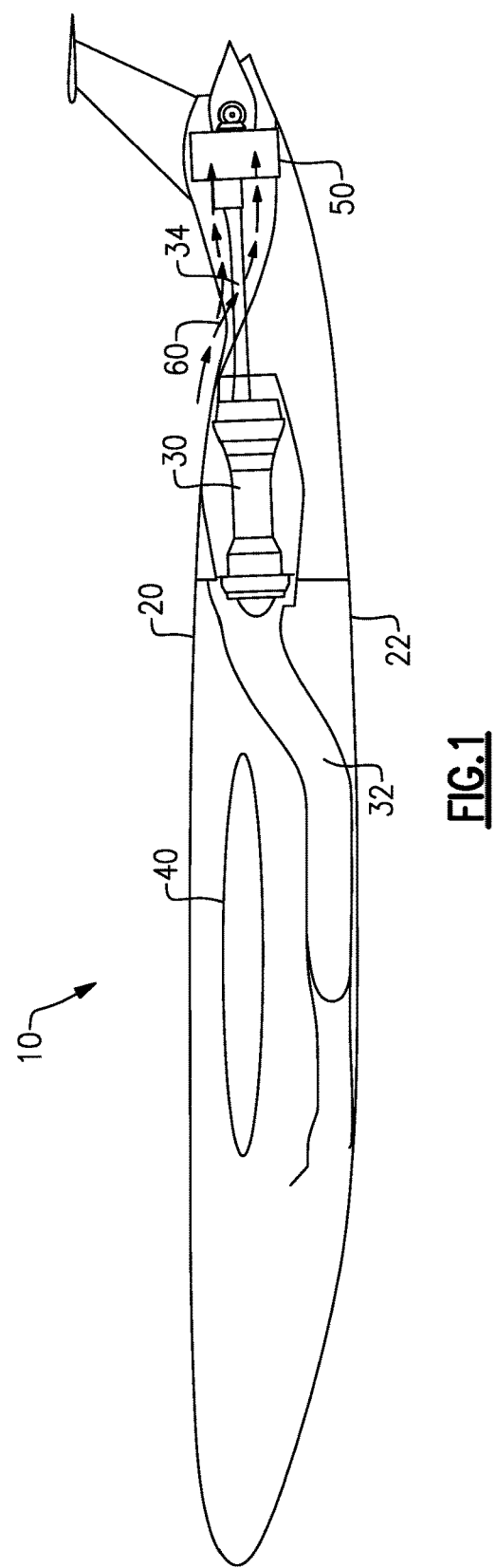
FIG. 1 schematically illustrates a side view of an example aircraft.

FIG. 1 schematically illustrates one example aircraft 10 including a fuselage 20, with a gas turbine engine core 30 disposed within the fuselage 20 in a tail section. The turbine engine core 30 is a standard turbine engine core including a compressor section, a combustor section where air from the compressor section is mixed with a fuel and combusted, and a turbine section across which the resultant combustion products are expanded. The expansion of the combustion products across the turbine section drives the turbine section to rotate. The turbine section is connected to the compressor section via a shaft and rotation of the turbine section drives rotation of the compressor section. In alternative examples, alternative gas turbine core constructions, such as those using a separately driven gas generator can be used in place of the illustrated turbine engine core 30. An inlet passage 32 allows air to be provided from below, and forward of, a wing 40 to the upstream end of the turbine engine core 30. Exhaust gasses from the turbine section of the turbine engine core 30 are passed through an exhaust duct and expelled aft of the fans 50. In some examples, the duct is positioned adjacent to a fan inlet flowpath 60

Supported on top of the fuselage 20, at the tail section of the aircraft 10, are multiple fans 50. The fans 50 are driven to rotate by the turbine engine core 30, and provide thrust for the aircraft 10. In the illustrated example, each of the fans 50 is pitched downward. In other words, the aft facing fan outlet is angled upwards, relative to a bottom 22 of the fuselage 20. Connecting the aft end of the turbine section of the turbine engine core 30 to a hub of one of the aft fans 50 is a shaft 34. The shaft 34 is contained at least partially within the fuselage 20, and extends to the fan 50 through a portion of a fan inlet flowpath 60. Due to the axial separation of the fan 50 from the turbine engine core 30, the configuration is referred to as a "long shaft" engine configuration. The fan 50 connected to the shaft 34 is directly driven by the shaft 34, and the turbine section of the turbine engine core 30. In alternative examples a geared connection can be used in place of the direct drive system.

Figure 2:
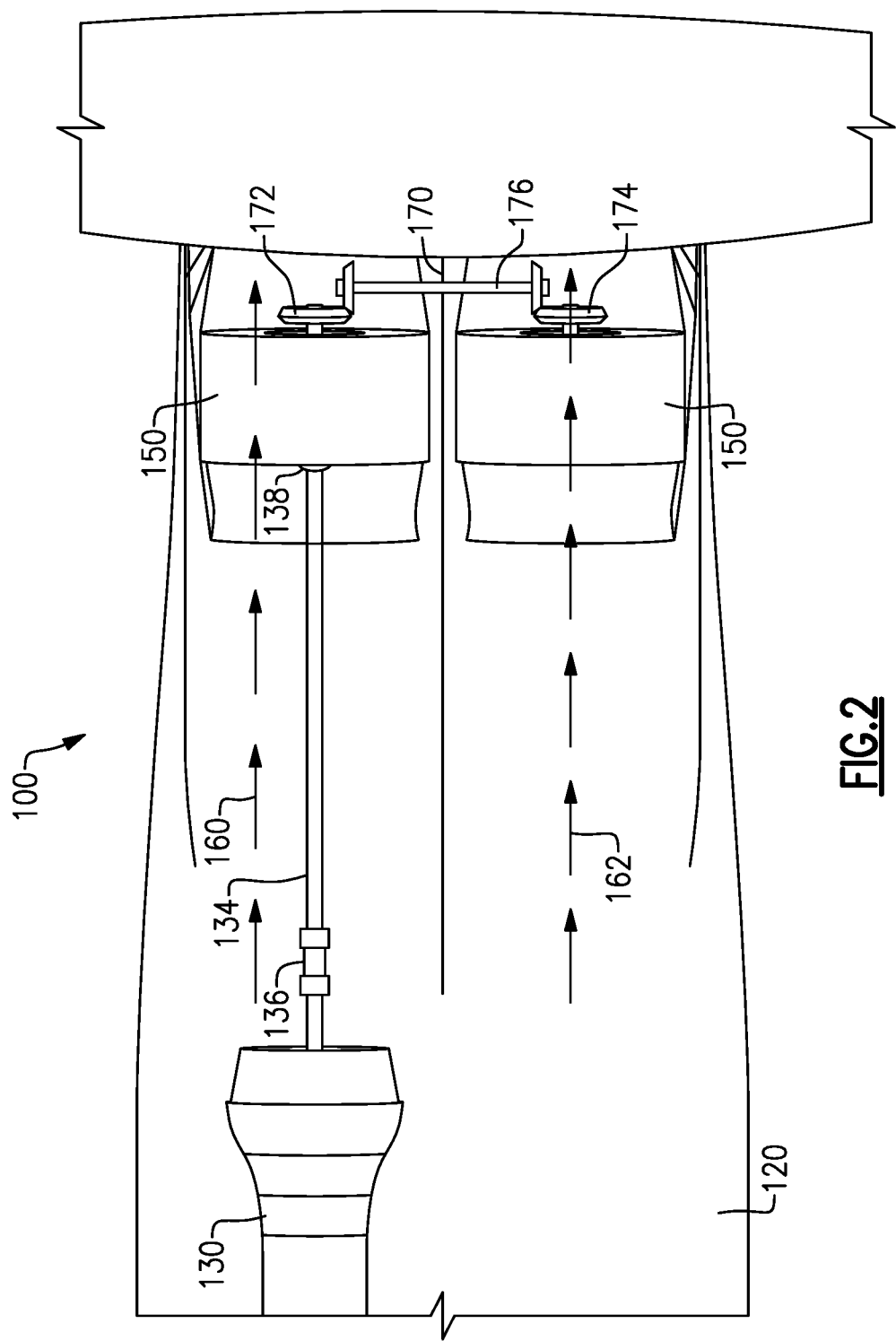
FIG. 2 schematically illustrates a top view of a tail section of an example aircraft.
Figure 3:
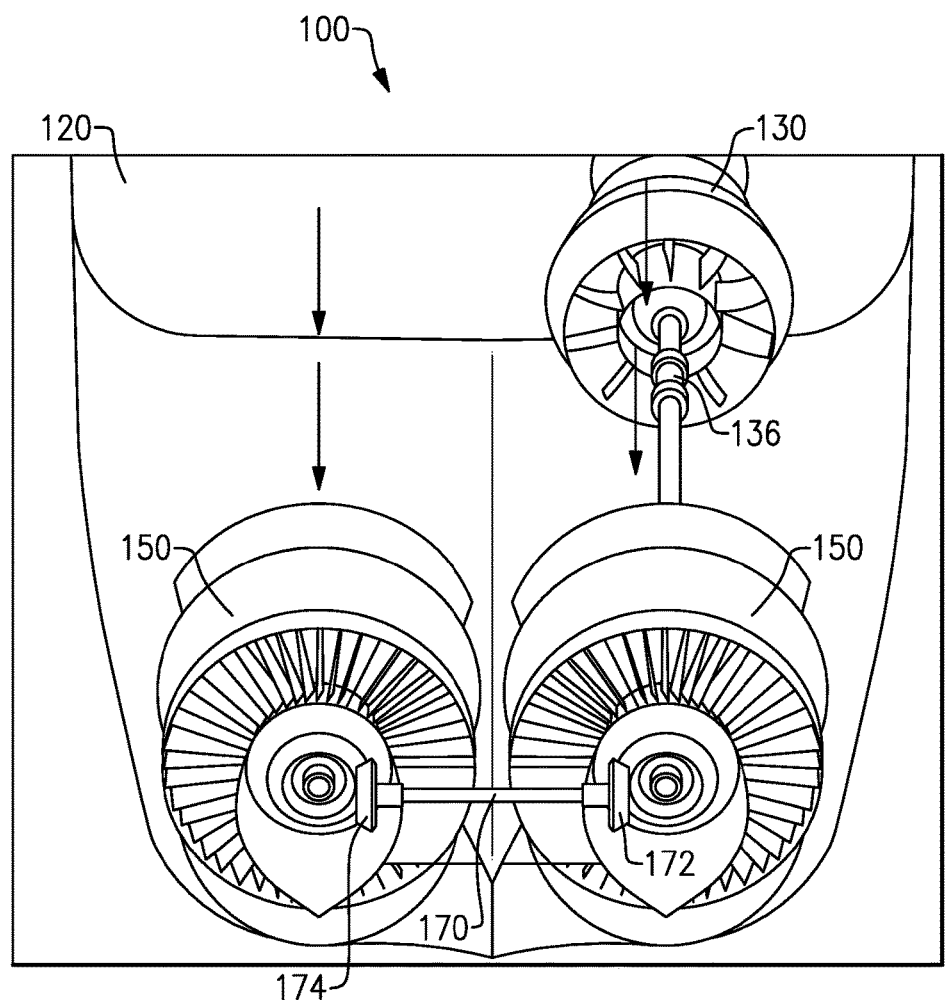
FIG. 3 schematically illustrates an angled view of the tail section of FIG. 2.

With continued reference to FIG. 1, and with like numerals indicating like elements, FIG. 2 illustrates a tail section 100 of an example aircraft including a long shaft engine configuration. Similarly, FIG. 3 illustrates an angled aft view of the tail section 100 of FIG. 2. As with the example of FIG. 1, the aircraft includes a fuselage 120 with two fans 150 disposed at least partially within the fuselage 120. A hub of a first fan 150, of the two fans 150, is connected to a turbine engine core 130 via a long shaft 134. The long shaft 134 passes at least partially through an inlet flowpath 160 of the first fan 150. A second fan inlet flowpath 162 is disposed adjacent the first fan inlet flowpath 160, and the long shaft 134 does not pass through the second fan inlet flowpath 162. The long shaft 134 is supported via a bearing system 136 in the fuselage 120, and a corresponding bearing system 138 at a hub of the fan inlet of the first fan 150.

In order to drive the second fan 150 without a direct connection to the long shaft 134, a gearing system 170 connects an aft end of the hub of each fan 150 to the aft end of the hub of the other fan 150. In the illustrated example, the gearing system 170 includes bevel gears 172, 174 at the aft hub of each fan 150, and a connecting member 176. In alternative examples, alternative gearing systems aside from the illustrated bevel gear system can be utilized.

Figure 6:
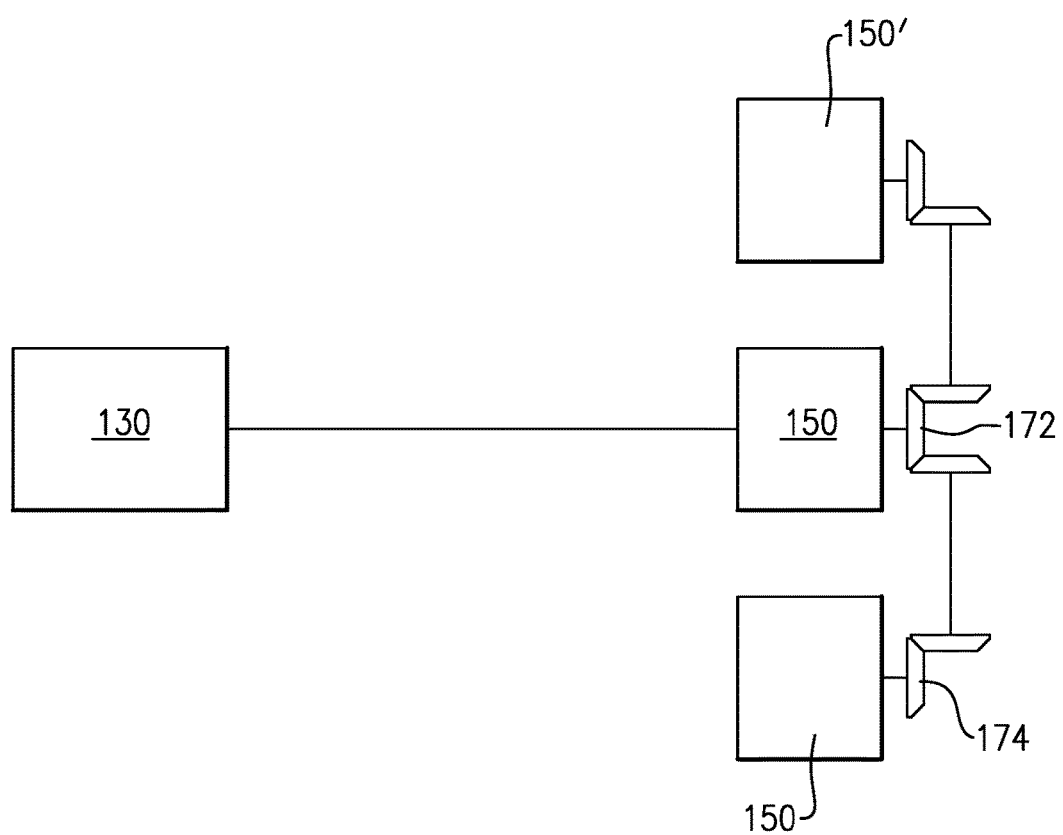
FIG. 6 schematically illustrates a top view of an alternate tail section.

While illustrated herein as including two fans 150 driven by a single turbine engine core 130, one of skill in the art will appreciate that alternate configurations, such as one utilizing three fans 150 (illustrated schematically at FIG. 6), can be devised according to this description. In the three fan example, the turbine engine core 130 is centered within the fuselage 120 of the aircraft, rather than offset on one side. Further, in the three fan example, the center fan 150 is directly driven by the turbine engine core 130, and two gearing systems of the same type as gearing system 170 are utilized to drive rotation of the adjacent fans 150.

Figure 4:
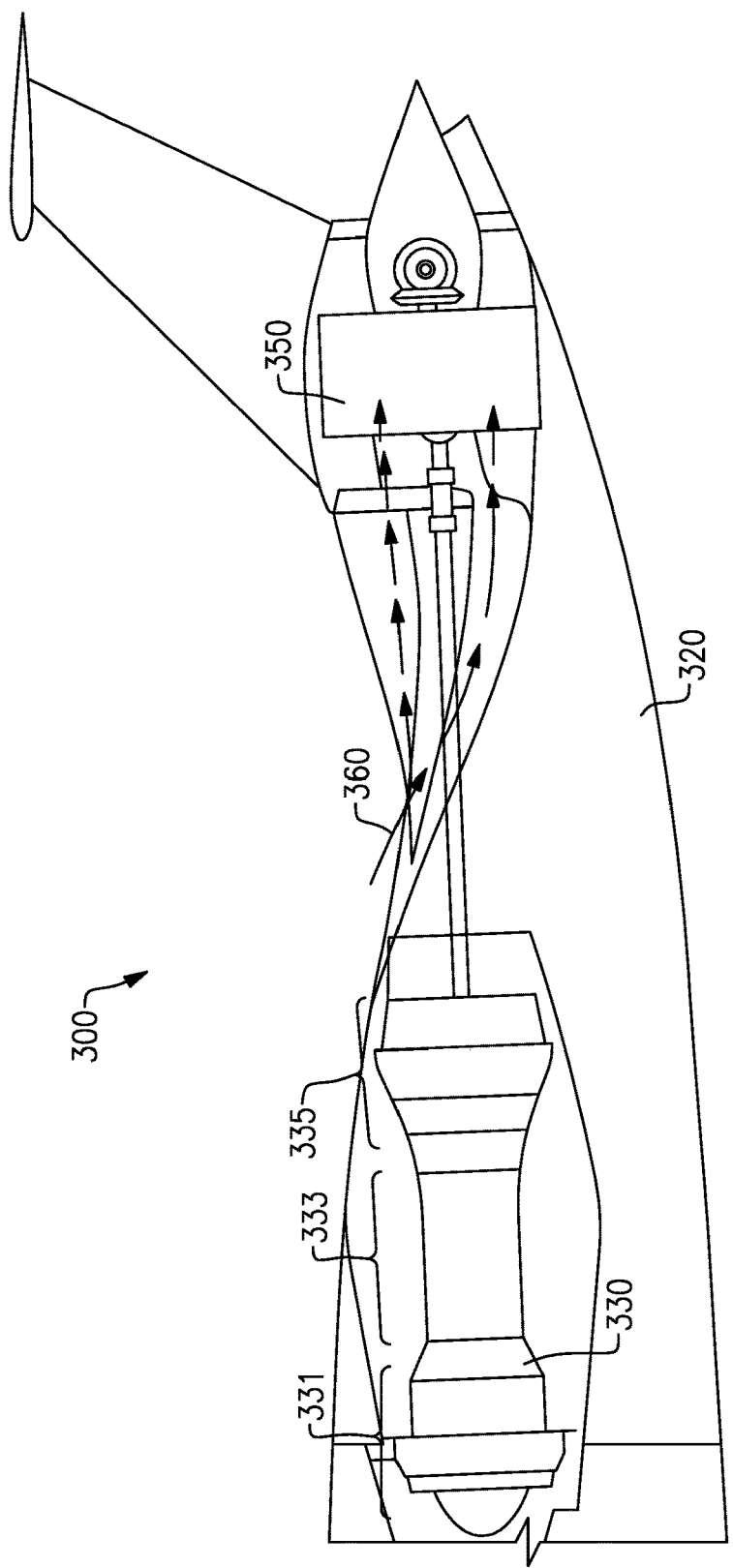
FIG. 4 schematically illustrates a side view of the example aircraft of FIGS. 2 and 3.

With continued reference to FIGS. 1-3, and with like numerals indicating like elements, FIG. 4 illustrates a side view of an example multi-fan engine configuration 300, such as the examples of FIGS. 1-3. The gas turbine engine core 330 includes a compressor section 331, a combustor section 333, and a turbine section 335. Air is provided to the compressor section 331 via an inlet flowpath, such as the inlet passage 32 illustrated in FIG. 1.

Aft of the turbine section 335, the fuselage 320 defines a fan inlet flowpath 360 that allows air in the boundary layer adjacent to the fuselage 320 to be drawn into the fan inlet, increasing the ability of the fan 350 to provide thrust.

Figure 5:
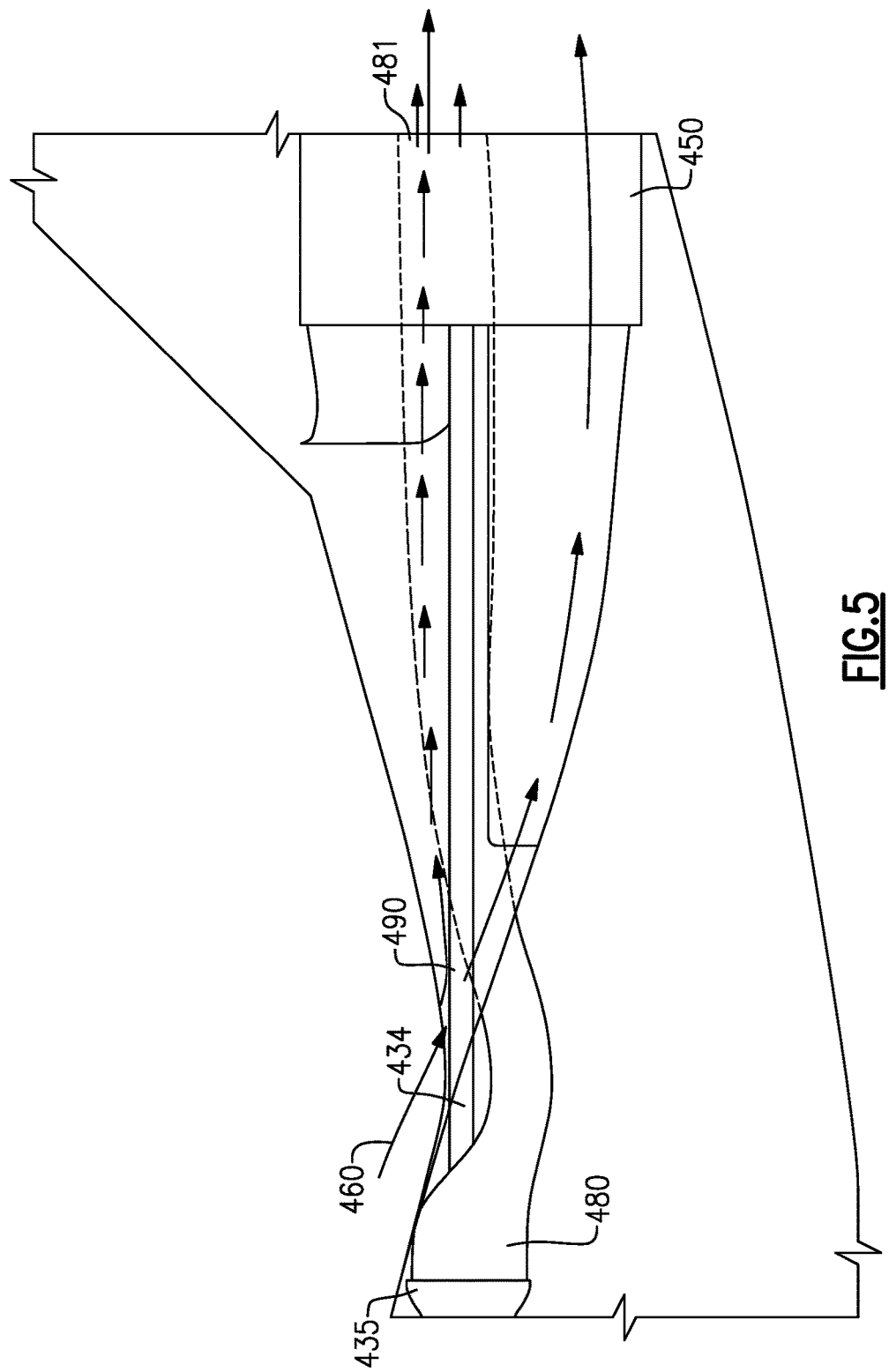
FIG. 5 illustrates a side view of a tail section of an aircraft according to an example.

In some examples, exhaust gas from the turbine section of the turbine engine core 330 is exhausted to an exhaust port positioned adjacent to at least one of the fans 150 through a duct. With continued reference to FIGS. 1-4, and with like numerals indicating like elements, FIG. 5 illustrates one such example. The aftmost end of a turbine section 435 exhausts into an exhaust duct 480. The exhaust duct 480 is wrapped around the shaft 434, and unwraps from around the shaft as the exhaust duct 480 proceeds aft. The exhaust duct 480 includes an aft directed exhaust port 481 that expels the exhaust gas in the same general direction as the outlet from the fans 450.

Further illustrated in the example of FIG. 5 is a shaft sleeve 490 that surrounds, or partially surrounds the portion of the shaft 434 that extends through the fan inlet flowpath 460. In some example embodiments, the sleeve 490 completely surrounds the shaft 434, and in other embodiments, the sleeve 490 only surround the top portion of the shaft 434, leaving a bottom portion of the shaft 434 exposed to the inlet flowpath 460.

In yet further alternative examples, the sleeve 490 can have an aerodynamic profile relative to an expected direction of air entering the fan inlet flowpath 460, decreasing the impact of the sleeve 490 on the air traveling through the fan inlet flowpath 460. By way of example, the aerodynamic profile can be teardrop shaped or airfoil shaped, depending on the specific desired flow characteristics.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. An aircraft engine core comprising:
   gas powered turbine core;
   a first fan connected to said turbine core via a shaft, the fan being positioned aft of the turbine;
   a second fan connected to said first fan via a geared connection such that the second fan is driven by the first fan;
   at least one of the first fan and the second fan is pitched downward; and the first fan is between the geared connection and the turbine core.

2. The aircraft engine of claim 1, further comprising a turbine exhaust flowpath adjacent to at least one of a first fan inlet flowpath and a second fan inlet flowpath.

3. The aircraft engine of claim 1, wherein the shaft is disposed in a fan inlet flowpath of at least one of said first fan and said second fan.

4. The aircraft engine of claim 1, wherein the shaft is disposed in the fan inlet flowpath of the first fan.

5. The aircraft engine of claim 1, wherein the geared connection is a bevel gear.

6. The aircraft engine of claim 1, further comprising a third fan connected to the first fan via a geared connection, wherein the first fan is positioned between the second fan and the third fan.

7. The aircraft engine of claim 1, wherein the geared connection is downstream of the first fan and the second fan.

8. The aircraft engine of claim 1, wherein the geared connection is connected to a downstream hub of said first fan.

9. The aircraft engine of claim 8, wherein the geared connection is connected to a downstream hub of the second fan.

10. The aircraft engine of claim 1, further comprising a sleeve at least partially surrounding the shaft.

11. The aircraft engine of claim 10, wherein the sleeve is at least partially disposed in the fan inlet flowpath.

12. The aircraft engine of claim 11, wherein the sleeve includes an aerodynamic profile relative to an expected direction of fluid flow through the fan inlet flowpath.

13. An aircraft comprising:
a fuselage; and
an aircraft engine configuration including:
  a first thrust producing fan and a second thrust producing fan mounted to a tail section of said fuselage;
  a turbine engine core;
  a shaft mechanically connecting said turbine engine core to said first thrust producing fan, such that rotation of the turbine engine core is translated to the first thrust producing fan;
  a gearing system connecting said first thrust producing fan to said second thrust producing fan such that rotation of the first thrust producing fan drives rotation of the second thrust producing fan; and
  an exhaust manifold connecting an output of said turbine engine core to an aft exhaust port, wherein the aft exhaust port is adjacent the first thrust producing fan.

14. The aircraft of claim 13, further comprising a first fan inlet flowpath at least partially defined by said fuselage.

15. The aircraft of claim 13, wherein the first thrust producing fan is a direct drive fan.

16. The aircraft of claim 13, wherein the gearing system is a beveled gear connection.

17. The aircraft of claim 13, wherein at least one of the first fan and the second fan is pitched downward.

18. The aircraft of claim 13, further comprising a sleeve disposed at least partially about said shaft.

19. The aircraft of claim 18, wherein said sleeve comprises an aerodynamic profile, relative to an expected direction of fluid flow through a first fan inlet flowpath.

* * * * *